United States Patent [19]

Lamarre

[11] Patent Number: 4,869,832

[45] Date of Patent: Sep. 26, 1989

[54] RADON REMOVAL METHOD

[75] Inventor: Bruce L. Lamarre, Piermont, N.H.

[73] Assignee: North East Environmental Products, Inc., Lebanon, N.H.

[21] Appl. No.: 72,553

[22] Filed: Jul. 13, 1987

[51] Int. Cl.[4] .............................................. C02F 1/58
[52] U.S. Cl. .................................... 210/747; 210/750; 55/66
[58] Field of Search ............... 210/747, 750, 902, 911, 210/758, 765; 55/66

[56] References Cited

U.S. PATENT DOCUMENTS

| | | | |
|---|---|---|---|
| 4,526,692 | 7/1985 | Yohe et al. | 210/747 |
| 4,582,610 | 4/1986 | Baker | 210/747 |
| 4,663,089 | 5/1987 | Lowry et al. | 210/750 X |
| 4,756,724 | 7/1988 | Yuill | 55/66 X |

OTHER PUBLICATIONS

Jerry D. Lowry, "Radon At Home", *Civil Engineering*, pp. 44–47, Feb. 1987.
David J. Hiltebrand et al., "Radon in Water Supply Wells: Treatment Facility Requirements and Costs", pp. 521–534 in *Radon, Radium, and Other Radioactivity in Ground Water, Hydrogeologic Impact and Application to Indoor Airborne Contamination*, Proceedings of the NWWA Conference, Apr. 7–9, 1987, Somerset.

*Primary Examiner*—Tom Wyse

[57] ABSTRACT

A radon removal system includes a packed mass transfer material aeration column and is sized to fit within a single story of a residential building. A residential water supply that is naturally contaminated with radioactive radon gas is connected to the top of the column. The water is preferably distributed across the top of the mass transfer packing by a coarse mist spray nozzle. The water splashes down through the packing and collects in a holding tank at the bottom of the column. Air, blown up through the column packing, comes into contact with the radon-laden water, and evaporates the radon out of the water. The radon-laden air is then vented outside the home.

6 Claims, 2 Drawing Sheets

RADON REMOVAL METHOD

BACKGROUND OF THE INVENTION

This invention relates to a process, apparatus and system for removing radioactive radon gas, (radon-222) from potable water supplies, particularly for residential use.

Radon is a colorless, odorless, radioactive gas produced from the natural decay of uranium. In outdoor air, radon is diluted and not recognized as a health hazard. However, when radon gas is trapped indoors in air or water, in sufficiently high concentrations, it can be dangerous. Radon has been shown in several epidemiological studies to be a very potent carcinogen that causes lung cancer in humans. In A Citizen's Guide to Radon OPA-86-004 the United States Environmental Protection Agency (EPA) stated that scientists have estimated that about 5,000 to about 20,000 of the 130,000 lung cancer deaths in the United States in 1986 may have been caused by long term exposure to radon gas. Of these 5,000 to 20,000 deaths, about 500 to 1500 have been attributed to radon from residential potable water supplies. The risk from water borne radon may be higher than the combined risk from all of the other man-made chemical contaminants in residential drinking water.

The EPA is currently developing standards for acceptable levels of radon in public water supplies. The range of values for radioactivity concentration being considered run from 500 pico-curies per liter (pc/l) to 40,000 pc/l. Although the EPA standard for public water supplies may not be directly applicable to private residences, it is likely that the public will accept and regard this standard as the safe level.

Naturally occurring radon in water generally emanates from the radium in bedrock surrounding an underground well and through which the water going to the well flows. This is in sharp contrast to the most commonly known sources of contamination in water, which generally arise from remote point contamination sources such as leaky pipes or improperly disposed of waste materials. As such, methods of purifying water of organic contamination are not clearly applicable to removing radon from water.

There are fundamentally two known methods for treatment of water supplies for radon removal in the prior art: decay storage and spray aeration. Conceptually, the simplest example of decay storage is a large baffled water storage tank. Since radon has a radiological half life of only 3.785 days, simply holding the contaminated water in a storage tank for approximately a month will greatly reduce the radon level. One problem with this type of decay storage is that it requires a large tank which maintains essentially plug flow conditions to prevent backmixing.

Another example of decay storage requires accumulation of the radon on an adsorbent material such as activated carbon. Since the radon decays relatively rapidly, the concentration of radon on the adsorbent bed will initially increase, and then gradually reach an equilibrium with the influent radon concentration in the water. One disadvantage with this type of system is that the adsorbent bed gives off radioactivity as the radon decays, which may present a health hazard. A second disadvantage is that it is difficult to legally dispose of the radioactive carbon filter when it becomes fouled by other water borne contaminants such as iron, sediment or bacteria.

Spray aeration is the only method of aeration which is known in the prior art to be practical on a residential scale for removal of radon. For such spray aeration systems, radon removal efficiencies are reported to be approximately 50% on each spray cycle. Therefore, in order to achieve an overall removal efficiency of 90%, the water must be recycled through the spray aeration device 3 to 4 times. This is disadvantageous in that it requires a spray tank that is relatively large, to provide a sufficient quantity of treated water for use in the home.

In addition, aeration of water using an air stripping column is known in the prior art as a method of removing volatile organic contaminants (VOC) such as trichloroethylene, tetrachloroethylene, and benzene from water. Two general types of air-stripping aeration systems are known. In one type of system, an aeration column of at least fifteen to thirty feet in height is required to remove more than 90% of the organic contaminants in a single pass through the system. An aeration column of such a height is not considered practical for residential use. In the second type of system, a shorter aeration column may be used to remove more than 90% of the organic contaminants in the water, but only with multiple passes of the water through the system. In one such system, contaminated water is taken from an underground well and repeatedly pumped through the aeration system and back into the well. The purified water pumped into the well creates a progressively larger buffer zone against influent organic contamination, which would not be useful in inhibiting further radon contamination as the radon source surrounds the well. Any purified water that was injected back into the well would simply become recontaminated with radon which is a product of the decay of Radium, a naturally occurring element in the bedrock into which the well is drilled.

SUMMARY OF THE INVENTION

A general feature of the invention is a system which efficiently removes radon from water, in a single pass without recycling the water through the system, comprising a vertically oriented hollow column having mass transfer packing material, an inlet adapted for distributing radon laden water and an outlet adapted for venting radon gas in the upper portion of the column, a gas blower in fluid communication with the column, and at least one fluid container in fluid communication with the lower portion of the column.

In preferred embodiments, the system has a column which is sized to fit within a single story of a residential building, preferably being less than seven feet, six inches in height and having a substantially circular cross section with a diameter of less than one foot. There is also preferably a pump in fluid communication with the inlet, which in turn is in fluid communication with a well containing radon-contaminated water having a radioactivity concentration in excess of 10,000 pc/l or the maximum contaminant level established by the EPA. Preferably also, the inlet is a course mist spray nozzle connected to the radon-contaminated well water for distributing the water evenly across the surface of the mass transfer packing. The gas blower is preferably located either near the bottom or near the top of the column to force air through the packed column to carry radon-laden air out of the building, with the fluid container being a tank of sufficient capacity to maintain a reservoir of treated water for immediate residential use either at the bottom of the column, or located remote from the column. Alternatively, there may be two fluid containers with a first fluid container at the bottom of the column, and a second fluid container remote from the column with a transfer pump in fluid communication with both fluid containers. In another preferred embodiment, the mass transfer material is packed to a height of less than six feet in the column, leaving a space between the nozzle and the mass transfer packing, upon a packing support screen.

Another general feature of the invention is a method of removing radon from radon laden potable water supplies comprising the steps of distributing the radon laden water in the upper portion of a vertically oriented hollow column containing mass transfer packing material, forcing air through the column to evaporate radon gas out of the radon laden water as the water splashes through the packing material, venting air laden with radon which has evaporated from the radon-laden water out of the column, and collecting water significantly purified by removal of radon (e.g. after removing on the order of 90% of the radon) as the water falls to the lower portion of the column, whereby the water so collected is suitable for use (e.g. bathing) without further removal of radon or further recycling of the processed water.

Preferred embodiments of the invention include positioning the column within a single story of a residential building, pumping the radon laden water from a well to the column, spraying the radon laden water upon the mass transfer packing material, blowing the air into the bottom of the column or drawing the air through the column, and pumping the collected water into a water container, whereby collected and stored water is available for immediate residential use (e.g. bathing).

The invention also provides a novel method of operation and automatic control sequence so that the pressure in the home water system is always maintained in a desired range.

Thus, the present invention provides an improved radon removal system for stripping potable residential water supplies of the radioactive gas radon 222, which is sized to fit within a residential structure, which continuously treats all of the water that the residential user demands and that the well can supply, which positively vents the stripped radon outside the home, and which reduces the radon concentration by at least 90% in a single pass through the equipment.

Other features and advantages of the invention will become apparent from the following description of the preferred embodiment and accompanying drawings, and from the claims.

DESCRIPTION OF THE PREFERRED EMBODIMENT

We first briefly describe the drawings.

Structure

Figure 1:
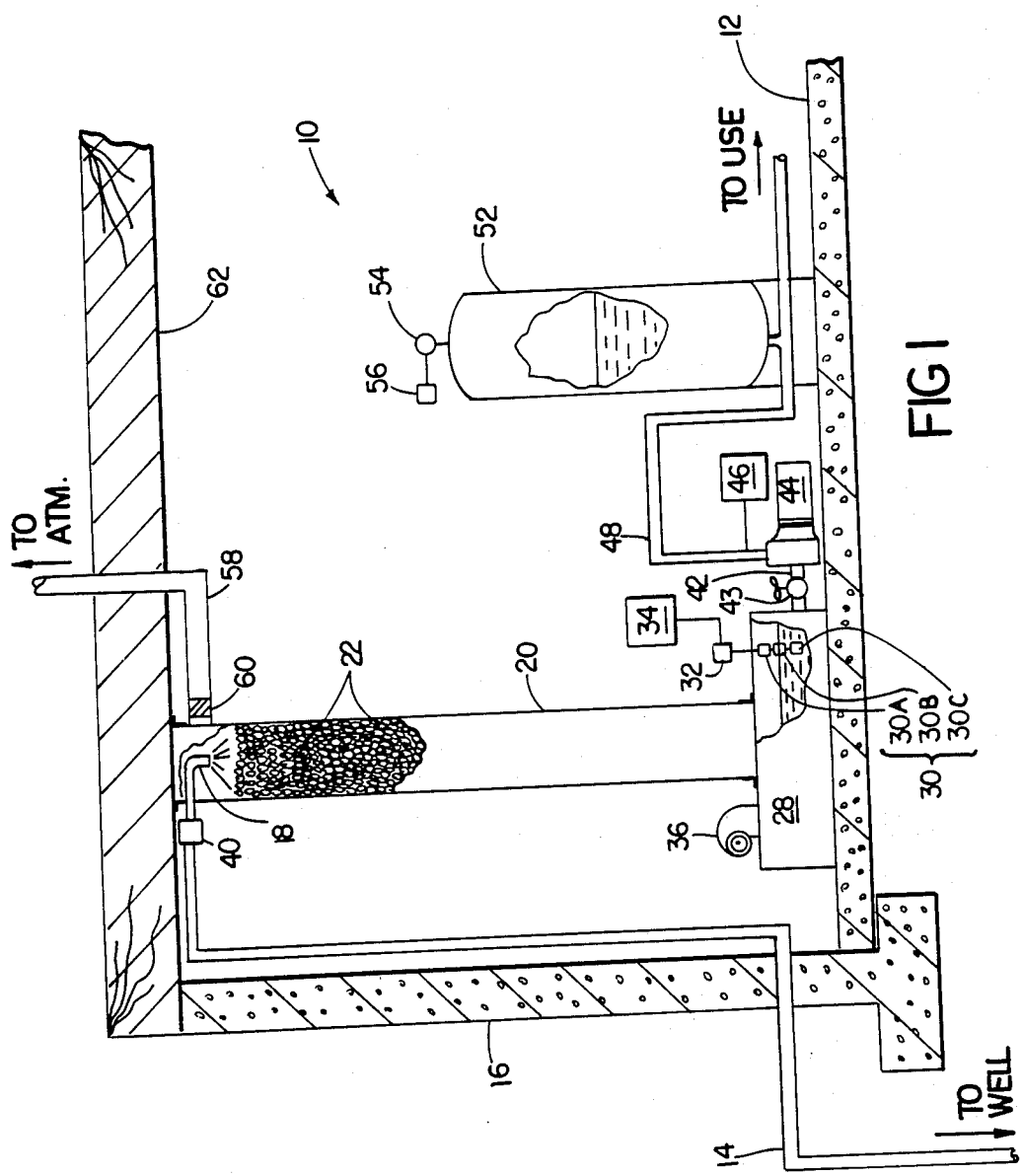
FIG. 1 is a side elevation view with parts cut away of a radon removal system constructed in accordance with the preferred embodiment of the present invention.

Referring to FIG. 1, there is a radon removal system 10 in accordance with the present invention located within the basement of a residential building, resting on a concrete floor 12. The system 10 is of the type manufactured by North East Environmental Products, Inc. A supply pipe 14 passes through a concrete wall 16 and leads to a well pump (not shown) and a well which contains radon contaminated water (not shown). The opposite end of the pipe 14 leads to a spray nozzle 18 located at the top of a vertically oriented hollow column 20.

The hollow column 20 is preferably sized to fit within a single story of a residential building, and is typically less than seven feet, six inches in height. The column 20 preferably is fabricated from PVC duct material and has a diameter on the order of eight inches. The internal diameter of the column 20 is selected to provide a surface loading rate, at the well pump rate, of on the order of five to forty gallons per minute per square foot.

Figure 2:
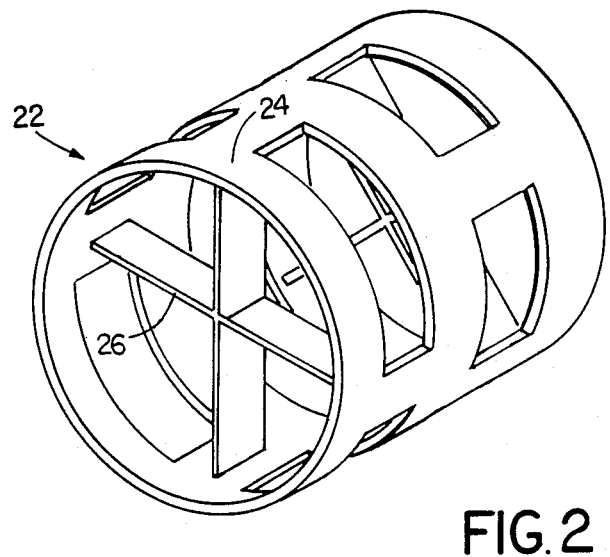
FIG. 2 is a perspective view of packing material used in the system of FIG. 1.

The column 20 contains polypropylene mass transfer packing material 22, which can be more clearly seen in FIG. 2. The packing material fills the column 20 to a height on the order of five feet, leaving a space between the top of the packing material and the spray nozzle 18. The packing material 22 preferably consists of either ⅝ inch or 1 inch Pall rings manufactured and sold by the Koch Company of Houston, Tex. Both of these sizes appear to perform equally well, however, the 1 inch size is currently most preferable, as it is less expensive per unit volume than the ⅝ inch size. The maximum nominal diameter of the packing material 22 is on the order of one-eighth of the internal diameter of the column 20. The preferred packing material 22 has a high surface to volume ratio, and consists of three linked open rings 24 and internal bracing members 26. Other commercially available mass transfer packings can also be used.

The column 20 is attached to an accumulator tank 28, preferably sized to contain on the order of 15 gallons of water. A float switch 30 within the tank 28 is connected to a transfer pump level control switch 32 which is in turn connected to a level control relay 34. The float switch 30 includes three distinct float switches, 30A, 30B and 30C. Switch 30B turns transfer pump 44 on, switch 30C turns transfer pump 44 off and switch 30A is a safety device which will be more fully described hereinafter.

Figure 3:
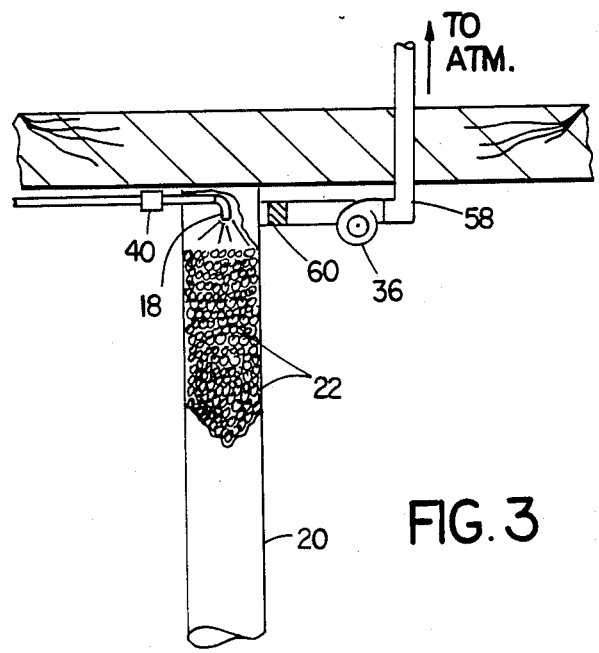
FIG. 3 is a side elevation view of a portion of an alternate embodiment of the system of FIG. 1.

An air blower 36, which preferably provides on the order of 20–40 cubic feet per minute of air, is located outside of the tank 28 for blowing air into the upper portion of the tank 28. As will be more fully set forth hereinafter, the blower 36 is controlled by a flow or pressure switch 40 located in the supply pipe 14 between the well pump and the spray nozzle 18. Alternatively, as shown in FIG. 3, the blower 36 could draw air out of the top of the column 20.

A transfer pipe 42, which has a check valve 43, connects the lower portion of the accumulator tank 28 to a transfer pump 44. The transfer pump 44 is preferably rated on the order of ⅓ horsepower providing on the order of 10 gallons per minute of water at 20 p.s.i. The pump 44 is controlled by a transfer pump pressure switch 46.

The transfer pump 44 is connected to a feed pipe 48. The feed pipe 48 feeds to a pressure tank 52. A pressure switch 54 is located at the top of the pressure tank 52, and a well pump control 56 is connected to the pressure switch 54. The well pump control 56 operates a well pump (not shown) located at the remote end of the supply pipe 14.

At the top of the hollow column 20, above the spray nozzle 18 is an air vent duct 58 containing a demister pad 60. The air vent duct 58 passes through a frame member 62 of the residential building and leads to the atmosphere.

Operation

Water contaminated with radon is pumped from the well (not shown) through the supply pipe 14 to the spray nozzle 18 at the top of the column 20. The radon laden water is sprayed from the nozzle 18 through the space above the packing material 22 onto the surface of the packing material. The water splashes through the packing material 22 and into the accumulator tank 28. Simultaneously, the air blower 36 blows air upward through the packing material 22 in the column 20.

The packing material 22 provides up to 10 equilibrium stages of contact between the falling water and rising air streams in the column 20. The blower 36 is preferably sized to provide an air to water flow rate ratio of between 5 to 1 and 100 to 1 cubic feet of air per cubic foot of water. The packing material 22 also serves to transfer oxygen into the water and to promote the oxidation of iron, which may be subsequently filtered or settled out of the water supply. Hydrogen sulfide, if present, is also substantially evaporated from the water. As is known from the prior art, packed column aeration systems will remove some portion of common volatile organic compounds from contaminated water supplies. The system of the present invention will probably remove less than 50% of the VOC'S After the purified water collects in the accumulator tank 28, it is pumped by the transfer pump 44 through he transfer pipe 42 and the feed pipe 48 to the pressure tank 52, from where it can be delivered for use (e.g. bathing) anywhere within the residence.

Air which has been blown upward through the packing material 22 and has thus become contaminated with radon is vented through the vent duct 58 outside of the residence. The vent may be either through the sill plate of the house (in the same manner as a dryer vent) or preferably through a pipe running to a point above the roof line, similar to a sewer vent.

Control Logic

The water supplied for use in the home by the feed pipe 48 typically has a pressure on the order of 20 to 40 p.s.i., as is commonly found in most homes. When water is used in the home, the water level and pressure inside the pressure tank 52 drop. When the pressure drops below 20 p.s.i., pressure switch 54 activates well pump control 56 which operates the well pump (not shown), sending radon laden water into the supply pipe 14. As the water flowing in pipe 14 flows toward the column 20, it activates the flow or pressure switch 40 starting the blower 36.

As the system operates, water collects in the accumulator tank 28 causing the float 30 to rise to a point that activates the transfer pump level control switch 32, which operates the transfer pump 44 through the level control relay 34, causing the transfer pump 44 to pump water from the accumulator tank 28 into the pressure tank 52. As water is pumped into the tank 52, the pressure in the tank and the feed pipe 48 increases. Once the pressure reaches 40 p.s.i., pressure switch 46 is activated, shutting off transfer pump 44, and pressure switch 54 is simultaneously activated shutting off the well pump (not shown).

The transfer pump 44 is preferably sized to pump more water than the well pump (not shown) and therefore, even during periods of continuous water use, the transfer pump 44 is able to stay ahead of the well pump. After the well pump shuts off, flow or pressure switch 40 detects the lack of flow.

In the event of failure of level switch 30B, the water flow from the well could continue longer than necessary, flooding the basement. To prevent this, if rising water in the accumulator tank 28 reaches a sufficiently high point, (level switch 30A) the transfer pump level control switch 32 will operate the level control relay 34, turning on transfer pump 44.

Testing

The radon removal system of the present invention has been tested using radon contaminated well water. Preliminary tests showed that 85% of the radon content could be removed from radon laden water having initial radon concentrations of between 9,500 and 11,000 pc/1, using blowing air at 15° F.

Three prototype radon removal systems have been fabricated and installed in private residences for long term operational performance testing. Test results for these prototypes show that untreated well water having an initial radon concentration of on the order of 25,000 pc/1 could be purified by about 92%, well water having an initial radon concentration of on the order of 51,000 pc/1 could be purified by about 90%, and well water having an initial radon concentration of on the order of 102,000 pc/1 could also be purified by about 90%.

What is claimed is:

1. A method of removing radon from water without recycling, comprising:
   distributing radon-laden water in the upper portion of a vertically oriented hollow column containing mass transfer packing material,
   forcing air through said column to evaporate radon gas out of the radon-laden water as the water splashes through said packing material,
   venting air laden with radon evaporated from the radon-laden water out of said column,
   collecting water significantly purified by removal of radon as the water falls to the lower portion of said column, and
   pumping the collected water into a water storage container remote from the source of the radon-laden water, whereby collected and stored water is available for immediate residential use without recycling through said mass transfer packing material.

2. The method of claim 1 further comprising positioning said column within a single story of a residential building.

3. The method of claim 1 further comprising pumping the radon laden water from a well to said column.

4. The method of claim 1 further comprising spraying the radon laden water upon said mass transfer packing material.

5. The method of claim 1 wherein said forced air is blown into the bottom of said column.

6. The method of claim 1 wherein said forced air is drawn through the column.

* * * * *